Jan. 5, 1954     F. K. H. NALLINGER     2,664,863
COOLING JACKET FOR INTERNAL-COMBUSTION ENGINES
Filed April 19, 1950
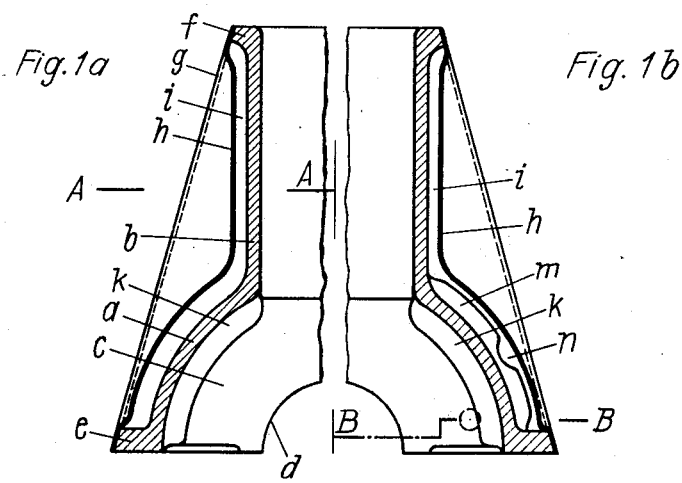
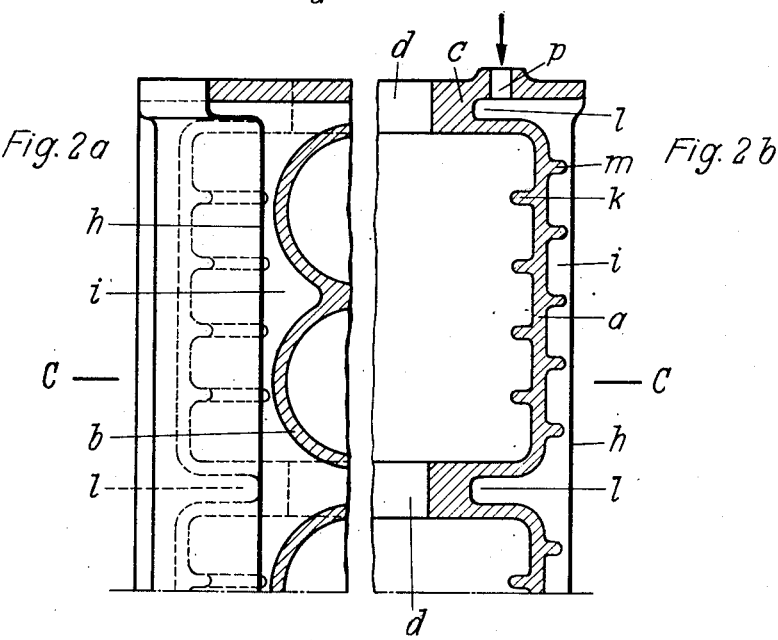
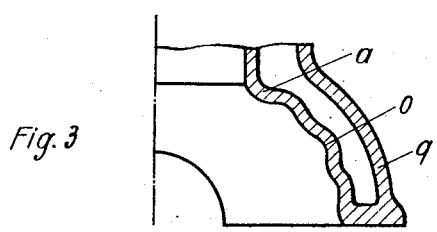
INVENTOR
FRIEDRICH K. H. NALLINGER
By Hazeltine, Lake & Co., AGENTS Patented Jan. 5, 1954

2,664,863

UNITED STATES PATENT OFFICE 2,664,863

COOLING JACKET FOR INTERNAL-COMBUSTION ENGINES

Friedrich K. H. Nallinger, Stuttgart, Germany, assignor to Daimler-Benz Aktiengesellschaft, Stuttgart-Unterturkheim, Germany Application April 19, 1950, Serial No. 156,753

Claims priority, application Germany April 20, 1949

6 Claims. (Cl. 123—41.33)

The invention refers to the development of a combustion engine casing and has above all as its purpose an improved cooling of the engine. Furthermore in connection herewith a simple, cheap and purposeful construction of the engine casing is aspired.

Expenditure, which would be additional with regard to the usual design of the engine casing, shall be prevented entirely, if possible.

The higher the number of revolutions of a combustion engine, the more heat is given out to the lubricant by the parts sliding on each other, also under otherwise equal circumstances, and the higher rises the temperature of the lubricant. For reasons of safety and wear and tear, however, the temperature of the lubricant shall not rise above a certain measure. The special heat exchangers, utilized hitherto for this reason for the exchange of the heat between the cooling agent and the lubricant require additional expenditure of construction, and increase therefore cost and weight of the plant and render manufacturing and assemblage more complicated.

In contrast to this it is the main characteristic of the invention that the cooling agent space, which serves for the cooling of the cylinder wall, extends one-sided or both-sided on the crank case, for example as far as the parting line (for example at the level of the crankshaft axle). By this a large heat exchanging wall surface is created between the lubricant, which is sprayed from the inside from the main and connecting rod bearings against the crank case, and the cooling agent, which surrounds the wall from the outside. The arrangement renders simultaneously possible a particularly high rate of decrease in temperature between lubricant and cooling agent, since the lubricant, spraying from the bearings (for example oil), has the highest temperature of the lubricant cycle and the cooling agent (e. g. cooling water), which is located in the lowest part of the cooling jacket and comes for example immediately from the cooler, has the lowest temperature of the cooling agent cycle.

The cooling action can still be increased by arrangement of ribs on the inside or outside of the crank case wall, by corrugated construction of same or the like. It is furthermore purposeful to cool the bearing bridges of the main bearings immediately by the cooling agent.

The cooling agent space, which is elongated as far as above the crank case, is purposefully constructed as a hollow space, which is open towards the side and closed by a sheet metal cover or a cover plate. The bearing surface areas of the sheet metal cover respectively of the cover plate are preferably arranged in one plane, so that they can be machined in a simple manner. Furthermore for the purpose of saving weight the external wall respectively the sheet metal cover or the cover plate for the cooling agent space are formed corresponding to the internal wall of same in such a manner that the result is a width of the cooling agent space, which is as small as possible (i. e. not exceeding the measure necessary for cooling).

In the drawing several examples of construction of the invention are figured as diagrams, i. e.

Figures 1a and 1b each show a vertical axis cut through an engine cylinder along line C—C of Figures 2a and 2b in two different forms of construction, Figures 2a and 2b show two horizontal cuts through the engine casing along line A—A of Figure 1a respectively line B—B of Figure 1b and Figure 3 shows a modified construction of the wall of the crank case in a vertical axis cut.

The casting of the engine casing consists of the crank case part $a$ and the cylinder part $b$. At its ends the case is limited by end walls $c$, in which one each of the main bearings $d$ is arranged. Provision is made for another main bearing $d$ for example in the middle of the casing between the ends. The lower flange $e$, the upper flange $f$ and the end walls $c$ at the side of the engine casing are limited at the side by a working surface $g$, which runs at an angle to the cylinder axis as a plane and can be manufactured by a milling cutter or the like. On this working surface a cover plate $h$, manufactured from sheet metal with circular packing joint is placed, whereby the cover is bent in accordance with the surface of the walls $a$ and $b$ of the engine cylinder, so that a narrow cooling middle space $i$ is formed between the engine wall and the cover plate $h$, which forms the outside wall of the jacket. Coming from the cooler, respectively from the water circulating pump, the cooling water is guided to the lower part of the cooling water space $i$ in an appropriate manner, e. g. through one or several borings $p$ in the end walls $c$, respectively in the cover plate $h$ and in the upper part of the cooling water jacket it can be guided either directly to the cooler or to the cooling water jacket of the cylinder head by appropriate connections.

Furthermore ribs $k$ are cast on the inside on the wall of the crank case part $a$ of the cast iron casing. In addition the main bearings $d$ for the crankshaft are formed hollow in such a manner that the hollow space $l$ is in connection with the cooling water space $i$ and is thereby traversed immediately by the cooling water. Guide metal sheets or rims $m$, which provide for controlled guidance of the cooling water to the hollow spaces of the bearings, can contribute effectively towards the support of cooling.

The oil, which leaves the crankshaft bearings respectively the connecting rod bearings and is thrown towards the wall $a$ respectively the ribs $k$, thereby gives out its heat through the wall of the casing to the cooling water, which flows through the cooling water space $i$. As a consequence of the large heat exchanging surface and the high rate of decrease in temperature between oil temperature and cooling water temperature, a particularly effective cooling of the lubricating oil is achieved.

The example of construction in accordance with Figures 1b and 2b is distinguished in the main from that in accordance with Figures 1a and 2a by the fact that in addition to the inside ribs $k$ provision is made for outside ribs $m$, which can be provided with hollow spaces $n$ for the cooling water.

At the example of construction in accordance with Figure 3 the wall $a$ of the crank case is formed in a corrugated manner. The corrugations $o$ can hereby, as in the drawing, run in longitudinal direction of the engine or in transverse planes respectively in any other direction. The outside wall $q$ of the cooling jacket forms in this case for example one piece with the rest of the engine casing.

The invention is not restricted to the examples of construction illustrated by the drawings. For example the cylinder part of the engine casing can also be manufactured separately from the crank case part. The individual parts of the invention can also be constructed in various combinations with each other.

What I claim is:

1. Combustion engine casing having a crank case part provided with a cooling jacket and comprising a wall, which separates the crank case space from the cooling jacket, said wall being formed with an enlarged surface for increased heat transmission.

2. Combustion engine casing in accordance with claim 1, wherein the wall, separating the crank case space from the cooling agent jacket, is provided with ribs.

3. Combustion engine casing in accordance with claim 1, wherein the wall, which separates the crank case space from the cooling agent jacket, is provided with ribs on the side of the cooling agent jacket.

4. Combustion engine casing in accordance with claim 1, wherein the wall, which separates the crank case space for the cooling agent jacket is provided with ribs on the side of the crank case space.

5. Combustion engine casing in accordance with claim 1, wherein the wall, which separates the crank case space from the cooling agent jacket, is constructed in a corrugated form.

6. Combustion engine casing as in claim 1, comprising a cylinder part and a crank case part with walls, which receive the crankshaft bearings and reach into the crank case space, wherein both the cylinder part and the crank case part are provided with a cooling agent jacket and where the cooling agent jacket extends as far as into the walls, which receive the crankshaft bearings.

FRIEDRICH K. H. NALLINGER.

References Cited in the file of this patent

UNITED STATES PATENTS

| Number | Name | Date |
|---|---|---|
| 1,133,531 | Breath | Mar. 30, 1915 |
| 1,763,664 | Lonas | June 17, 1930 |
| 1,903,719 | Mandler | Apr. 11, 1933 |
| 2,279,671 | Ford | Apr. 14, 1942 |
| 2,288,696 | Funderburk | July 7, 1942 |

FOREIGN PATENTS

| Number | Country | Date |
|---|---|---|
| 249,150 | Great Britain | Sept. 30, 1926 |
| 118,529 | Switzerland | Mar. 1, 1927 |
| 733,185 | France | July 4, 1932 |